Dec. 6, 1949   R. J. P. RUELLE   2,490,162
MOTOR VEHICLE
Filed Sept. 10, 1946
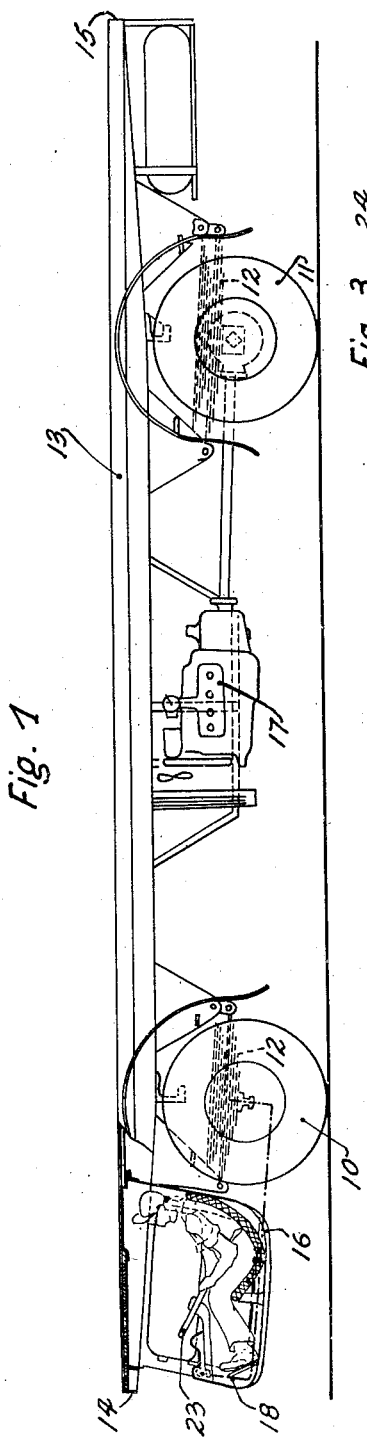
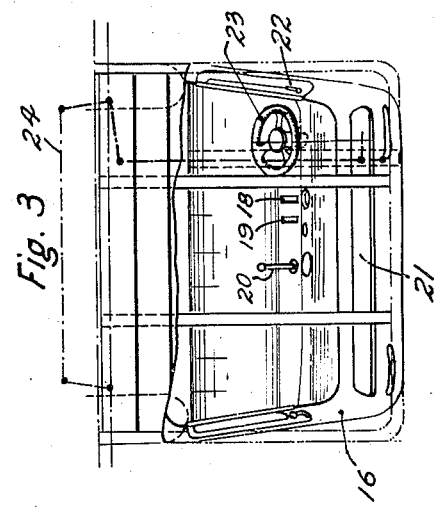
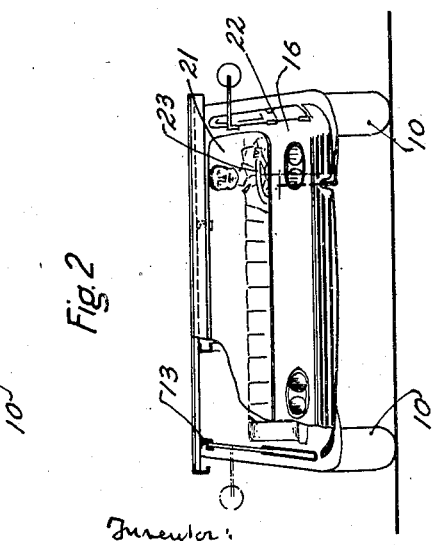
Inventor:
ROBERT JEAN PIERRE RUELLE Patented Dec. 6, 1949

2,490,162

UNITED STATES PATENT OFFICE 2,490,162

MOTOR VEHICLE

Robert Jean Pierre Ruelle, Paris, France

Application September 10, 1946, Serial No. 695,873
In France June 13, 1946

3 Claims. (Cl. 180—89)

My present invention relates to trucks provided with a load carrying body, and more particularly to trucks provided with a load carrying platform.

It is an object of my present invention to provide a truck constructed in such a manner that it is possible to place the loads to be carried onto the load carrying platform thereof, and to remove them from this platform without any interference and to load the platform with equal facility from the front, rear or either side without encountering any fixed obstructions thereon during the loading operation.

With the above objects in view, my present invention mainly consists in a truck comprising in combination a plurality of wheels, a load carrying body carried by the wheels and extending from the front end to the rear end of the truck, a driver's compartment arranged entirely under the load carrying body at the front end thereof, a motor also arranged entirely under the load carrying body, and control means connecting the driver's compartment with the motor and the wheels.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a side view of a platform truck according to my present invention, with parts at the front broken away;

Fig. 2 is a front view of the truck shown in Figure 1; and

Fig. 3 is a partial top view of the truck shown in Figures 1 and 2, with the front part of the platform broken away.

As shown in the drawings my new truck includes a set of front steering wheels 10 and a set of rear wheels 11. These wheels support, by means of spring 12 in well known manner the load carrying platform 13 of the truck. This platform extends from the front end 14 to the rear end 15 of the truck.

The closed driver's compartment 16 is arranged under the load carrying platform 13 near the front end 14 of the truck in front of the front wheels 10.

The motor 17 is arranged to the rear of the driver's compartment 16 and is also entirely under the load carrying platform 13.

The truck is also equipped with control means arranged also entirely under the load carrying platform 13 within the driver's compartment 16 extending therefrom in rearward direction to the motor 17, and the wheels 10 and 11.

These control means include a gas pedal 18, a brake pedal 19 and a hand-operated emergency brake 20 arranged within the driver's compartment 16.

The driver's compartment is preferably closed and provided in its front wall with a window 21 and in its side wall with a door 22. In the compartment itself, the steering wheel 23 is arranged in well known manner, and connected by means of steering mechanism 24 with the front steering wheels 10.

It will be understood that each of the elements described above, or two or more together, may also find a useful application in other types of load carrying vehicles differing from the types described above.

While I have illustrated and described the invention as embodied in a platform truck, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. A truck comprising in combination a plurality of wheels; a load carrying body carried by said wheels and extending from the front end to the rear end of said truck; a driver's compartment arranged entirely under said load carrying body and secured thereto at the front end thereof; a motor also arranged entirely under and secured to said load carrying body; and control means within said driver's compartment for controlling the operation of said motor and said wheels.

2. A truck comprising in combination a plurality of wheels; a load carrying platform carried by said wheels and extending from the front end to the rear end of said truck; a driver's compartment arranged entirely under said load carrying platform and secured thereto at the front end thereof; a motor also arranged entirely under and secured to said load carrying platform; and control means arranged also entirely under said load carrying platform within said driver's compartment for controlling the operation of said motor and said wheels.

3. A truck comprising in combination a plurality of wheels including a set of front wheels; a load carrying platform carried by said wheels and extending from the front end to the rear end of said truck; a closed driver's compartment arranged entirely under said load carrying platform and secured thereto at the front end thereof and in front of said set of front wheels; a motor arranged to the rear of said closed driver's compartment also entirely under and secured to said load carrying platform; and control means arranged also entirely under said load carrying platform and within said closed driver's compartment and extending therefrom in rearward direction and connected to said wheels and said motor for controlling said wheels and said motor from within said compartment.

ROBERT JEAN PIERRE RUELLE.

REFERENCES CITED

The following references are of record in the file of this patent:

UNITED STATES PATENTS

| Number | Name | Date |
|---|---|---|
| Re. 12,767 | Buckwalter | Mar. 24, 1908 |
| 2,267,509 | Strong | Dec. 23, 1941 |
| 2,290,652 | Russell | July 21, 1942 |
| 2,336,386 | Beck | Dec. 7, 1943 |
| 2,358,236 | Lee | Sept. 12, 1944 |
| 2,416,478 | Harbers | Feb. 25, 1947 |

FOREIGN PATENTS

| Number | Country | Date |
|---|---|---|
| 665,817 | Germany | Oct. 4, 1938 |